United States Patent
Lewis et al.

(10) Patent No.: US 10,421,063 B2
(45) Date of Patent: *Sep. 24, 2019

(54) HIGH CHARGE DENSITY SILICOMETALLOPHOSPHATE MOLECULAR SIEVES SAPO-69

(71) Applicant: UOP LLC, Des Plaines, IL (US)

(72) Inventors: Gregory J. Lewis, Santa Cruz, CA (US); Lisa Knight, Chicago, IL (US)

(73) Assignee: UOP LLC, des plaines, IL (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/446,363

(22) Filed: Mar. 1, 2017

(65) Prior Publication Data

US 2017/0252734 A1    Sep. 7, 2017

Related U.S. Application Data

(60) Provisional application No. 62/303,527, filed on Mar. 4, 2016.

(51) Int. Cl.

| | |
|---|---|
| *C01B 39/54* | (2006.01) |
| *B01J 29/85* | (2006.01) |
| *B01J 37/08* | (2006.01) |
| *B01J 29/87* | (2006.01) |
| *B01J 35/00* | (2006.01) |
| *C10G 2/00* | (2006.01) |

(52) U.S. Cl.
CPC ............... *B01J 29/85* (2013.01); *B01J 29/87* (2013.01); *B01J 35/002* (2013.01); *B01J 37/08* (2013.01); *C01B 39/54* (2013.01); *C10G 2/00* (2013.01)

(58) Field of Classification Search
CPC .................................. C01B 39/54; B01J 29/85
See application file for complete search history.

(56) References Cited

U.S. PATENT DOCUMENTS

| | | | |
|---|---|---|---|
| 3,443,892 A | 5/1969 | Wacks et al. | |
| 4,310,440 A | 1/1982 | Wilson et al. | |
| 4,440,871 A | 4/1984 | Lok et al. | |
| 4,500,651 A * | 2/1985 | Lok ..................... | B01J 20/186 502/150 |
| 4,567,029 A * | 1/1986 | Wilson .................. | B01J 27/18 208/114 |
| 4,683,217 A * | 7/1987 | Lok ........................ | B01J 29/85 423/306 |
| 4,778,780 A | 10/1988 | Valyocsik et al. | |
| 4,853,197 A * | 8/1989 | Wilson .................. | B01J 29/85 423/306 |
| 4,870,222 A | 9/1989 | Bakas et al. | |
| 4,973,785 A * | 11/1990 | Lok ........................ | B01J 29/85 208/111.05 |
| 5,126,308 A | 6/1992 | Barger et al. | |
| 5,157,196 A | 10/1992 | Crossland et al. | |
| 5,157,197 A | 10/1992 | Cooper et al. | |
| 5,302,362 A * | 4/1994 | Bedard .................. | C01B 39/54 423/306 |
| 6,776,975 B2 | 8/2004 | Wilson et al. | |
| 8,696,886 B1 | 4/2014 | Lewis et al. | |
| 8,697,927 B1 | 4/2014 | Lewis et al. | |
| 8,871,177 B2 | 10/2014 | Lewis et al. | |
| 8,871,178 B2 | 10/2014 | Lewis et al. | |
| 8,911,704 B2 | 12/2014 | Lewis et al. | |
| 2014/0193327 A1 | 7/2014 | Casci et al. | |
| 2017/0252732 A1 | 9/2017 | Lewis et al. | |
| 2017/0252733 A1* | 9/2017 | Lewis .................... | B01J 29/85 |

FOREIGN PATENT DOCUMENTS

| | | |
|---|---|---|
| RU | 2445166 C2 | 3/2012 |
| WO | 2004039725 A2 | 5/2004 |

OTHER PUBLICATIONS

Broach, "New ABC-6 net molecular sieves ZnAPO-57 and ZnAPO-59: Framework charge density-induced transition from two- to three-dimensional porosity", Microporous and Mesoporous Materials 189 (2014) 49-63.

Flanigen, "Phosphorus Substitution in Zeolite Frameworks", Molecular Sieve Zeolites-I, Chapter 6, pp. 76-101, Chapter DOI: 10.1021/ba-1971-0101.ch006; Advances in Chemistry, vol. 101; ISBN13: 9780841201149eISBN: 9780841222816; Publication Date (Print): Aug. 1, 1974; Copyright © 1971 American Chemical Society.

Gatter, "Stability of Framework Aluminum in the New Zeolite UZM-5", Studies in Surface Science and Catalysis, vol. 154; pp. 1324-1331; E. van Steen, L.H. Callanan and M. Claeys (Editors); Copyright 2004 Elsevier B.V.

Kuhl, "High-silica analogs of zeolite A containing intercalated phosphate", Inorg. Chem., 1971, 10 (11), pp. 2488-2495.

Wilson, "Synthesis, characterization and structure of SAPO-56, a member of the ABC double-six-ring family of materials with stacking sequence AABBCCBB", Microporous and Mesoporous Materials 28 (1999) 125-137.

Search Report dated Jun. 1, 2017 for corresponding PCT Appl. No. PCT/US2017/020366.

* cited by examiner

*Primary Examiner* — David M Brunsman

(57) ABSTRACT

A new family of crystalline microporous silicometallophosphate designated SAPO-69 has been synthesized. These silicometallophosphate are represented by the empirical formula of:

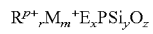

$$R^{p+}{}_r M_m{}^+ E_x P Si_y O_z$$

where M is an alkali metal such as potassium, R is an organoammonium cation such as ethyltrimethylammonium and E is a trivalent framework element such as aluminum or gallium. The SAPO-69 family of materials represent the first phosphate-based molecular sieves to have the OFF topology and have catalytic properties for carrying out various hydrocarbon conversion processes and separation properties for separating at least one component.

7 Claims, No Drawings

HIGH CHARGE DENSITY SILICOMETALLOPHOSPHATE MOLECULAR SIEVES SAPO-69

CROSS-REFERENCE TO RELATED APPLICATION

This application claims priority from Provisional Application No. 62/303,527 filed Mar. 4, 2016, the contents of which are hereby incorporated by reference.

FIELD OF THE INVENTION

This invention relates to a new family of charged silicometallophosphate-based molecular sieves designated SAPO-69. They are represented by the empirical formula of:

$$R^{p+}{}_r M_m{}^+ E_x PSi_y O_z$$

where M is an alkali metal such as potassium, R is an organoammonium cation such as ethyltrimethylammonium and E is a trivalent framework element such as aluminum or gallium. The SAPO-69 family of materials represents the first phosphate-based molecular sieves to have the OFF topology and have "Si islands."

BACKGROUND OF THE INVENTION

Zeolites are crystalline aluminosilicate compositions which are microporous and which are formed from corner sharing $[AlO_{4/2}]^-$ and $SiO_{4/2}$ tetrahedra. Numerous zeolites, both naturally occurring and synthetically prepared are used in various industrial processes. Synthetic zeolites are prepared via hydrothermal synthesis employing suitable sources of Si, Al and structure directing agents (SDAs) such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces of the zeolite as well as on internal surfaces within the pores of the zeolite.

In 1982, Wilson et al. developed aluminophosphate molecular sieves, the so-called AlPOs, which are microporous materials that have many of the same properties of zeolites, but are silica free, composed of $[AlO_{4/2}]^-$ and $[PO_{4/2}]^+$ tetrahedra (See U.S. Pat. No. 4,319,440). Subsequently, charge was introduced to the neutral aluminophosphate frameworks via the substitution of $SiO_{4/2}$ tetrahedra for $[PO_{4/2}]^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $[AlO_{4/2}]^-$ tetrahedra, which yield the MeAPO molecular sieves (see U.S. Pat. No. 4,567,029). It is furthermore possible to introduce framework charge on AlPO-based molecular sieves via the introduction both of $SiO_{4/2}$ and $[M^{2+}O_{4/2}]^{2-}$ tetrahedra to the framework, giving MeAPSO molecular sieves (See U.S. Pat. No. 4,973,785).

More recently, Lewis et al. developed solution chemistry leading to higher charge density SAPO, MeAPO, and MeAPSO materials, enabling greater substitution of $SiO_{4/2}$ and $[M^{2+}O_{4/2}]^{2-}$ into the framework for $[PO_{4/2}]^+$ and $[AlO_{4/2}]^-$, respectively, using the ethyltrimethylammonium (ETMA$^+$) and diethyldimethylammonium (DEDMA$^+$) SDAs. These materials include ZnAPO-57 (U.S. Pat. No. 8,871,178), ZnAPO-59 (U.S. Pat. No. 8,871,177), ZnAPO-67 (U.S. Pat. No. 8,697,927, and MeAPSO-64 (U.S. Pat. No. 8,696,886). The relationship between the increasing product charge densities and reaction parameters, namely the ETMAOH(DEDMAOH)/H$_3$PO$_4$ ratios, were outlined in the literature (See Microporous and Mesoporous Materials, 189, 2014, 49-63).

Applicants have now synthesized a new family of charged silicometallophosphate framework materials with even higher charge densities than those mentioned above, designated SAPO-69. The SAPO-69 materials are the first microporous phosphates to have the OFF topology (See Database of Zeolite Structures, www.iza-structure.org/databases) and are synthesized in a mixed organoammonium/alkali SDA system, for example ETMA$^+$/K$^+$. The utility of alkali in AlPO-based systems is uncommon and is required here to achieve the higher charge density. The SAPO-69 materials contain "Si islands" and are thermally stable to at least 575° C.

SUMMARY OF THE INVENTION

As stated, the present invention relates to a new family of silicometallophosphate molecular sieves designated SAPO-69. Accordingly, one embodiment of the invention is a microporous crystalline material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of:

$$R^{p+}{}_r M_m{}^+ E_x PSi_y O_z$$

where R is an organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.2 to about 3.0, "p" is the weighted average valence of R and varies from 1 to 2, M is an alkali metal such as Li$^+$, Na$^+$, K$^+$, Rb$^+$ and Cs$^+$ and mixtures thereof, "m" is the mole ratio of M to P and varies from 0.2 to 3.0, E is a trivalent element selected from the group consisting of aluminum and gallium and mixtures thereof, "x" is the mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation:

$$z=(m+p \cdot r+3 \cdot x+5+4 \cdot y)/2$$

and is characterized in that it has the x-ray diffraction pattern having at least the d-spacings and intensities set forth in Table A:

TABLE A

| 2Θ | d(Å) | I/I$_0$ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |

TABLE A-continued

| 2Θ | d(Å) | I/I₀ % |
|---|---|---|
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m |

Another embodiment of the invention is a process for preparing the crystalline silicometallophosphate molecular sieve described above. The process comprises forming a reaction mixture containing reactive sources of R, E, P, M and Si, and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bM_2O:E_2O_3:cP_2O_5:dSiO_2:eH_2O$$

where "a" has a value of about 2.5 to about 20, "b" has a value of about 0.125 to about 1.5, "c" has a value of about 2 to about 8, "d" has a value of about 1 to about 8, and "e" has a value from 50 to 1000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the invention is a separation process using the crystalline SAPO-69 material. The process may involve separating mixtures of molecular species or removing contaminants by contacting a fluid with the SAPO-69 molecular sieve. Separation of molecular species can be based either on the molecular size (kinetic diameter) or on the degree of polarity of the molecular species. Removing contaminants may be by ion exchange with the molecular sieve.

DETAILED DESCRIPTION OF THE INVENTION

Applicants have prepared the first family of silicometallophosphate compositions with the OFF topology, designated SAPO-69. Compared to other SAPO materials, the SAPO-69 family of materials contains much more Si and exhibits high framework (FW) charge densities that require the use of alkali cations in addition to organoammonium ions to balance the FW charge. Traditional SAPOs chiefly use organic-based species for FW charge balance. The instant microporous crystalline material (SAPO-69) has an empirical composition in the as-synthesized form and on an anhydrous basis expressed by the empirical formula:

$$R^{p+}_rM_m^+E_xPSi_yO_z$$

where M is at least one alkali cation and is selected from the group of alkali metals. Specific examples of the M cations include but are not limited to lithium, sodium, potassium, rubidium, cesium and mixtures thereof. R is an organoammonium cation, examples of which include but are not limited to ethyltrimethylammonium (ETMA⁺), hexamethonium (HM²⁺), choline [Me₃NCH₂CH₂OH]⁺, trimethylpropylammonium, diethyldimethylammonium (DEDMA⁺), tetramethylammonium (TMA⁺) tetraethylammonium (TEA⁺), tetrapropylammonium (TPA⁺) and mixtures thereof and "r" is the mole ratio of R to P and varies from about 0.2 to about 3.0, while "p" is the weighted average valence of R and varies from about 1 to 2. The value of "m" is the mole ratio of M to P and varies from 0.2 to about 3.0, "x" is mole ratio of E to P and varies from 1.25 to about 4.0. The ratio of silicon to P is represented by "y" which varies from about 0.30 to about 4.5 and "y">"x"−1. E is a trivalent element which is tetrahedrally coordinated, is present in the framework and is selected from the group consisting of aluminum and gallium. Lastly, "z" is the mole ratio of O to E and is given by the equation:

$$z=(m+r\cdot p+3\cdot x+5+4\cdot y)/2.$$

When only one type of R organoammonium cation is present, then the weighted average valence is just the valence of that cation, e.g., +1 or +2. When more than one R cation is present, the total amount of R is given by the equation:

$$R_r^{p+}=R_{r1}^{(p1)+}+R_{r2}^{(p2)+}+R_{r3}^{(p3)+}+\ldots$$

the weighted average valence "p" is given by:

$$p=\frac{r1\cdot p1+r2\cdot p2+r3\cdot p3+\cdots}{r1+r2+r3+\cdots}$$

The SAPO-69 of this invention is characterized by a high charge density compared to that known for most SAPO materials and the significant formation of "Si islands," i.e., Si—O—Si bonding. The FW charge on ideal SAPO-69 in terms of the formula given above is "x"−1 or Al-P. The charge on these materials is so high that highly charged alkali cations are required in addition to organoammonium cations to balance the FW charge. Often in SAPO materials, the compositional relationship between Al, Si and P is given by "x"−1="y" or Al-P=Si or equivalently, Al=P+Si. In this case, compared to a neutral AlPO-based material, Si only substitutes for P, adding FW charge in the process. All FW phosphorous must be isolated because it can only be bonded to Al in the framework via P—O—Al bonding, and therefore, the Si substituting for P is also isolated. Such is the case for the moderately high charge density SAPO-59 (see U.S. Pat. No. 8,871,177). "Si islands" are known in the art even for lower charge density materials, for example, for SAPO-56 (See Microporous and Mesoporous Materials, 28, (1999), 125-137). In the present case of SAPO-69, the requirement is that there are "Si islands" as represented by the specification that "y">"x"−1, i.e., Si>Al-P. This means there is more Si than is required to accommodate the FW charge due to Si substitution for P, meaning that some of the Si is no longer isolated. The formation of "Si islands" is extensive in the SAPO-69 family because often "y">"x," or Si>Al, a much higher degree of Si incorporation than replacement of P for FW charge considerations, i.e., "y"="x"−1.

The microporous crystalline silicometallophosphate SAPO-69 is prepared by a hydrothermal crystallization of a reaction mixture prepared by combining reactive sources of R, E, phosphorous, M and silicon. A preferred form of the SAPO-69 materials is when E is Al. The sources of aluminum include but are not limited to aluminum alkoxides, precipitated aluminas, aluminum metal, aluminum hydroxide, aluminum salts, alkali aluminates and alumina sols. Specific examples of aluminum alkoxides include, but are not limited to aluminum ortho sec-butoxide and aluminum ortho isopropoxide. Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the other E elements include but are not limited to precipitated gallium hydroxide, gallium chloride, gallium sulfate or gallium nitrate. Sources of the M metals include the halide salts, nitrate salts, hydroxide salts, acetate salts, and sulfate salts of the respective alkali metals. R is an organoammonium cation selected from the group consisting of ETMA$^+$, HM$^{2+}$, choline, DEDMA$^+$, trimethylpropylammonium, TMA$^+$, tetraethylammonium (TEA$^+$), tetrapropylammonium (TPA$^+$) and mixtures thereof, and the sources include the hydroxide, chloride, bromide, iodide and fluoride compounds. Specific examples include without limitation ethyltrimethylammonium hydroxide, ethyltrimethylammonium chloride, hexamethonium dihydroxide, hexamethonium dichloride, choline hydroxide, choline chloride, diethyldimethylammonium chloride, diethyldimethylammonium hydroxide, propyltrimethylammonium chloride and tetramethylammonium chloride. In one embodiment R is ETMA$^+$. In another embodiment, R is HM$^{2+}$. In yet another embodiment, R is a combination of ETMA$^+$ and at least one organoammonium cation selected from the group consisting of choline, DEDMA$^+$, TMA$^+$, HM$^{2+}$, trimethylpropylammonium, TEA$^+$, and TPA$^+$.

The reaction mixture containing reactive sources of the desired components can be described in terms of molar ratios of the oxides by the formula:

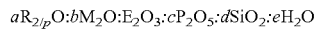

$$aR_{2/p}O\!:\!bM_2O\!:\!E_2O_3\!:\!cP_2O_5\!:\!dSiO_2\!:\!eH_2O$$

where "a" varies from about 2.5 to about 20, "b" varies from about 0.125 to about 1.5, "c" varies from about 2 to about 8, "d" varies from about 1 to about 8, and "e" varies from 50 to 1000. If alkoxides are used, it is preferred to include a distillation or evaporative step to remove the alcohol hydrolysis products. The reaction mixture is now reacted at a temperature of about 100° C. to about 200° C. and preferably from about 125° C. to about 175° C. for a period of about 1 day to about 3 weeks and preferably for a time of about 2 days to about 14 days in a sealed reaction vessel at autogenous pressure. After crystallization is complete, the solid product is isolated from the heterogeneous mixture by means such as filtration or centrifugation, and then washed with deionized water and dried in air at ambient temperature up to about 100° C. SAPO-69 seeds can optionally be added to the reaction mixture in order to accelerate the formation of the desired microporous composition.

The SAPO-69 silicometallophosphate-based material, which is obtained from the above-described process, is characterized by the x-ray diffraction pattern, having at least the d-spacings and relative intensities set forth in Table A below.

TABLE A

| 2Θ | d(Å) | I/I$_0$ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |

TABLE A-continued

| 2Θ | d(Å) | I/I$_0$ % |
|---|---|---|
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m |

In one embodiment of the invention, the SAPO-69 is thermally stable up to a temperature of at least 400° C., in another embodiment the SAPO-69 is thermally stable up to a temperature of at least 500° C. and in still another embodiment the SAPO-69 is thermally stable up to a temperature of at least 575° C.

The SAPO-69 may be modified in many ways to tailor it for use in a particular application. Modifications include calcination, ammonia calcinations, ion-exchange, steaming, various acid extractions, ammonium hexafluorosilicate treatment, or any combination thereof, as outlined for the case of UZM-4 in U.S. Pat. No. 6,776,975 B1 which is incorporated by reference in its entirety. In addition, properties that may be modified include porosity, adsorption, framework composition, acidity, thermal stability, etc.

As synthesized, the SAPO-69 material will contain some of the exchangeable or charge balancing cations in its pores. These exchangeable cations can be exchanged for other cations, or in the case of organic cations, they can be removed by heating under controlled conditions. A preferred method of removing organic cations from the pores is ammonia calcination. Calcination in air converts the organic cations in the pores to protons, which can lead to the loss of some metal, for example Al, from the framework upon exposure to ambient atmospheric water vapor. When the calcination is carried out in an ammonia atmosphere, the organic cation in the pore is replaced by NH$_4^+$ cation and the framework remains intact (See Studies in Surface Science, (2004) vol. 154, p. 1324-1331). Typical conditions for ammonia calcinations include the use of gaseous anhydrous ammonia flowing at a rate of 1.1 l/min while ramping the sample temperature at 5° C./min to 500° C. and holding at that temperature for a time ranging from 5 minutes to an hour. The resulting ammonium/alkali form of SAPO-69 has essentially the diffraction pattern of Table A. Once in this form, the ammonia calcined material may be ion-exchanged with H$^+$, NH$_4^+$, alkali metals, alkaline earth metals, transition metals, rare earth metals, or any mixture thereof, to achieve a wide variety of compositions with the SAPO-69 framework in superior condition.

When SAPO-69 is calcined in air, there can be a loss of metal from the framework, such as Al, which can alter the x-ray diffraction pattern from that observed for the as-synthesized SAPO-69 (See Studies in Surface Science, (2004) vol. 154, p. 1324-1331). However, it has been determined that SAPO-69 is stable to removal of organic cations via calcination, remaining crystalline after calcination, as demonstrated in the examples. Typical conditions for the calcination of the SAPO-69 sample include ramping the temperature from room temperature to a calcination temperature of 400-600° C., preferably a calcination temperature of 450-550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1 to 10 hours and preferably for a period of 2 to 4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the SAPO-69 sample will spend a period of 1 to 24 hours and preferably a period of 2 to 6 hours under these conditions to complete the calcination process. The calcined SAPO-69 material is characterized in that it has the x-ray diffraction pattern having at least the d-spacings and intensities set forth in Table B:

TABLE B

| 2Θ | d(Å) | $I/I_0$ % |
|---|---|---|
| 7.82-7.65 | 11.30-11.55 | s-vs |
| 11.89-11.67 | 7.44-7.58 | w-m |
| 13.47-13.30 | 6.57-6.65 | m |
| 14.20-13.96 | 6.23-6.34 | w |
| 19.62-19.32 | 4.52-4.59 | w |
| 20.69-20.35 | 4.29-4.36 | w-m |
| 23.52-23.08 | 3.78-3.85 | w-m |
| 23.84-23.52 | 3.73-3.78 | w-m |
| 25.06-24.64 | 3.55-3.61 | w-m |
| 27.08-26.75 | 3.29-3.33 | w |
| 28.49-28.22 | 3.13-3.16 | w-m |
| 31.36-31.03 | 2.85-2.88 | m |
| 31.59-31.25 | 2.83-2.86 | m |
| 33.67-33.28 | 2.66-2.69 | w |
| 36.04-35.74 | 2.49-2.51 | w |
| 36.34-35.89 | 2.47-2.50 | w |
| 41.09-40.61 | 2.195-2.22 | w |
| 43.04-42.40 | 2.10-2.13 | w |
| 46.04-45.31 | 1.97-2.00 | w |
| 46.53-46.04 | 1.95-1.97 | w |
| 48.65-48.10 | 1.87-1.89 | w |
| 51.91-51.13 | 1.76-1.785 | w |
| 56.03-55.12 | 1.64-1.665 | w |

The crystalline SAPO-69 materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The SAPO-69 compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204° to 649° C.), preferably between 600° and 950° F. (316° and 510° C.). Reaction pressures are in the range of atmospheric to about 3,500 psig (24,132 kPag), preferably between 200 and 3000 psig (1379 and 20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the SAPO-69 composition using feedstocks such as gas oils, heavy naphthas, deasphalted crude oil residua, etc. with gasoline being the principal desired product. Temperature conditions of 850° to 1100° F. (455° to 593° C.), LHSV values of 0.5 $hr^{-1}$ to 10 $hr^{-1}$ and pressure conditions of from about 0 to 50 psig (0 to 345 kPa) are suitable.

Alkylation of aromatics usually involves reacting an aromatic (C2 to C12), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1,379-6,895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 $hr^{-1}$ to about 120 $hr^{-1}$. Details on paraffin alkylation may be found in U.S. Pat. Nos. 5,157,196 and 5,157,197, which are incorporated by reference.

The conversion of methanol to olefins is effected by contacting the methanol with the SAPO-69 catalyst at conversion conditions, thereby forming the desired olefins. The methanol can be in the liquid or vapor phase with the vapor phase being preferred. Contacting the methanol with the SAPO-69 catalyst can be done in a continuous mode or a batch mode with a continuous mode being preferred. The amount of time that the methanol is in contact with the SAPO-69 catalyst must be sufficient to convert the methanol to the desired light olefin products. When the process is carried out in a batch process, the contact time varies from about 0.001 hour to about 1 hour and preferably from about 0.01 hour to about 1.0 hour. The longer contact times are used at lower temperatures while shorter times are used at higher temperatures. Further, when the process is carried out in a continuous mode, the Weight Hourly Space Velocity (WHSV) based on methanol can vary from about 1 hr$^{-1}$ to about 1000 hr$^{-1}$ and preferably from about 1 hr$^{-1}$ to about 100 hr$^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e. g., methane, aromatic hydrocarbons, e. g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any well known catalyst reaction apparatus known in the art. Thus, a single reaction zone or a number of zones arranged in series or parallel may be used. In such reaction zones the methanol feedstock is flowed through a bed containing the SAPO-69 catalyst. When multiple reaction zones are used, one or more SAPO-69 catalysts may be used in series to produce the desired product mixture. Instead of a fixed bed, a dynamic bed system, e. g., fluidized or moving, may be used. Such a dynamic system would facilitate any regeneration of the SAPO-69 catalyst that may be required. If regeneration is required, the SAPO-69 catalyst can be continuously introduced as a moving bed to a regeneration zone where it can be regenerated by means such as oxidation in an oxygen containing atmosphere to remove carbonaceous materials.

The following examples are presented in illustration of this invention and are not intended as undue limitations on the generally broad scope of the invention as set out in the appended claims. The products will be designated with the name SAPO-69 that contains the suffix "-69" to indicate the "-69" structure (OFF topology) and the prefix that reflects the compositional nature of the product, namely "SAPO" for a silicometallophosphate, although it is understood that Al may be replaced in part or fully by Ga in any of these examples.

The structure of the SAPO-69 compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 20 to 560 (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as:

w=0-15; m=15-60: s=60-80 and vs=80-100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

A Teflon beaker was charged with 146.55 g ETMAOH (20.47 wt %) and equipped with a high speed stirrer. Added 12.13 g TEOS (98%) and allowed to stir 10 minutes. Then 5.79 g pre-ground aluminum isopropoxide (AIP, 13.2 wt % Al) was added and dissolved with stirring. The reaction mixture was transferred to a Teflon bottle, sealed and placed in an oven at 95° C. to hydrolyze TEOS. After 1.5 hours, the clear solution was transferred back to the Teflon beaker under the stirrer, where it was allowed to cool with stirring. Then 19.57 g H$_3$PO$_4$ (85.7%) was added dropwise with continued stirring. The resulting clear solution was additionally diluted with 45.0 g deionized water. Separately, 1.41 g KOAc (99.4%) was dissolved in 15.2 g deionized water and added fast dropwise, resulting in a clear solution. The resulting clear solution was distributed among 7 Teflon-lined autoclaves and digested at temperatures of 95° C. for 183 hours, and 125°, 150° and 175° C. for 48 and 183 hours at autogenous pressures. The products were isolated by centrifugation, washed with deionized water and dried at room temperature. The product isolated from the 175° C. synthesis after 183 hours was identified as SAPO-69 via powder x-ray diffraction. Representative diffraction lines for the 175° C., 183 hours product are shown in Table 1. Elemental analysis of this product yielded the empirical composition ETMA$_{0.61}$K$_{0.44}$Al$_{2.02}$PSi$_{2.49}$O$_{\sim 11}$.

TABLE 1

| 2-Θ | d(Å) | I/I$_0$ % |
|---|---|---|
| 7.72 | 11.44 | m |
| 11.70 | 7.56 | w |
| 13.38 | 6.61 | m |
| 14.00 | 6.32 | w |
| 15.46 | 5.73 | m |
| 17.80 | 4.98 | w |
| 19.42 | 4.57 | m |
| 20.48 | 4.33 | m |
| 23.26 | 3.82 | m |
| 23.64 | 3.76 | s |
| 24.78 | 3.60 | m |
| 26.90 | 3.31 | m |

TABLE 1-continued

| 2-Θ | d(Å) | I/I₀ % |
|---|---|---|
| 27.08 | 3.29 | w |
| 28.20 | 3.16 | m |
| 30.46 | 2.93 | w |
| 31.18 | 2.87 | vs |
| 31.32 | 2.85 | s |
| 33.38 | 2.68 | w |
| 35.51 | 2.53 | w |
| 35.84 | 2.50 | m |
| 36.10 | 2.49 | m |
| 40.85 | 2.21 | w |
| 42.62 | 2.12 | w |
| 42.84 | 2.11 | w |
| 43.38 | 2.08 | w |
| 45.56 | 1.90 | w |
| 46.18 | 1.97 | w |
| 47.94 | 1.90 | w |
| 49.56 | 1.84 | w |
| 51.30 | 1.78 | w |
| 55.42 | 1.66 | w |

EXAMPLE 2

A Teflon beaker was charged with 146.55 g ETMAOH (20.47 wt %) and equipped with a high speed stirrer. Added 10.11 g TEOS (98%) and allowed to stir 10 minutes. Then 4.82 g pre-ground aluminum isopropoxide (AIP, 13.2 wt % Al) was added and dissolved with stirring. The reaction mixture was transferred to a Teflon bottle, sealed and placed in an oven at 95° C. to hydrolyze TEOS. After 1.5 hours, the clear solution was transferred back to the Teflon beaker under the stirrer, where it was allowed to cool with stirring while some of the EtOH and iPrOH evaporated. Then 16.31 g $H_3PO_4$ (85.7%) was added dropwise with continued stirring. The resulting clear solution was additionally diluted with 15.0 g deionized water. Separately, 1.17 g KOAc (99.4%) was dissolved in 15.0 g deionized water and added fast dropwise, resulting in a clear solution. The resulting clear solution was distributed among 7 Teflon-lined autoclaves and digested at temperatures of 95° C. for 182 hours, and 125°, 150° and 175° C. for 48 and 182 hours at autogenous pressures. The products were isolated by centrifugation, washed with deionized water and dried at room temperature. The product isolated from the 175° C. synthesis after 182 hours was identified as SAPO-69 via powder x-ray diffraction, although a small amount of amorphous material was detected in the background. Representative diffraction lines for the 175° C., 183 hours product are shown in Table 2.

TABLE 2

| 2-Θ | d(Å) | I/I₀ % |
|---|---|---|
| 7.72 | 11.45 | m |
| 11.69 | 7.56 | w |
| 13.36 | 6.62 | m |
| 13.99 | 6.33 | w |
| 15.42 | 5.74 | w |
| 17.69 | 5.01 | w |
| 19.40 | 4.57 | m |
| 20.46 | 4.34 | m |
| 23.24 | 3.82 | m |
| 23.62 | 3.76 | s |
| 24.72 | 3.60 | m |
| 26.90 | 3.31 | m |
| 28.18 | 3.16 | m |
| 31.32 | 2.85 | vs |
| 33.36 | 2.68 | w |

TABLE 2-continued

| 2-Θ | d(Å) | I/I₀ % |
|---|---|---|
| 35.82 | 2.50 | w |
| 36.03 | 2.49 | w |
| 40.82 | 2.21 | w |
| 42.58 | 2.12 | w |
| 42.78 | 2.11 | w |
| 47.92 | 1.90 | w |
| 51.30 | 1.78 | w |
| 55.42 | 1.66 | w |

EXAMPLE 3

A Teflon bottle was charged with 146.55 g ETMAOH (20.47 wt %), a stir bar, and 6.07 g TEOS (98%), sealed and allowed to stir 2 days to hydrolyze TEOS. The reaction mixture was transferred to a Teflon beaker equipped with a high speed stirrer. Then 5.79 g pre-ground aluminum isopropoxide (AIP, 13.2 wt % Al) was added and dissolved with stirring. To the resulting clear solution, 19.57 g $H_3PO_4$ (85.7%) was added dropwise with continued stirring. The resulting clear solution was additionally diluted with 45.00 g deionized water. Separately, 1.41 g KOAc (99.4%) was dissolved in 15.13 g deionized water and added fast dropwise, the solution was allowed to homogenize further. The resulting clear solution was distributed among 8 Teflon-lined autoclaves which were digested at various temperatures for a variety of time periods at autogenous pressures. The products were isolated by centrifugation, washed with deionized water and dried at room temperature. The product isolated from the 175° C. synthesis after 204 hours was identified as SAPO-69 via powder x-ray diffraction. Representative diffraction lines for the 175° C., 183 hours product are shown in Table 3a. A portion of the sample was characterized by hot stage powder X-ray diffraction. The sample was ramped up to 575° C. in a flow of nitrogen, with X-ray patterns taken at various temperatures along the way. The sample was stable at all temperatures, giving the diffraction pattern indicative of SAPO-69. The sample was then exposed to ambient atmosphere at 575° C. and for 4 hours and retained its structure, as indicated in Table 3b. Another portion of the sample was calcined at 525° C. and submitted for a BET surface area measurement, giving a surface area of 363 m²/g and a micropore volume of 0.24 cc/g. Scanning Electron Microscopy showed the sample to consist of rounded hexagonal cylinders 200 to 500 nm in diameter and 300 to 400 nm tall, each seemingly bundles of smaller crystals. Elemental analysis revealed the material to have the empirical formula $ETMA_{0.61}K_xAl_{2.02}PSi_{2.43}$, the potassium content was not measured in this sample.

TABLE 3

| 2-Θ | d (Å) | I/I₀ (%) |
|---|---|---|
| TABLE 3a | | |
| 7.74 | 11.42 | vs |
| 11.68 | 7.57 | m |
| 13.38 | 6.61 | m |
| 14.00 | 6.32 | w |
| 15.48 | 5.72 | m |
| 17.80 | 4.98 | w |
| 19.42 | 4.57 | m |
| 20.48 | 4.33 | m |
| 23.28 | 3.82 | s |
| 23.65 | 3.76 | vs |
| 24.70 | 3.60 | vs |

TABLE 3-continued

| 2-Θ | d (Å) | I/I₀ (%) |
|---|---|---|
| 26.94 | 3.31 | m |
| 28.20 | 3.16 | m |
| 31.30 | 2.86 | vs |
| 33.40 | 2.68 | w |
| 35.90 | 2.50 | m |
| 36.10 | 2.49 | m |
| 39.30 | 2.29 | w |
| 40.88 | 2.21 | w |
| 42.62 | 2.12 | w |
| 42.80 | 2.11 | w |
| 43.40 | 2.08 | w |
| 45.59 | 1.99 | w |
| 47.87 | 1.90 | m |
| 49.59 | 1.84 | w |
| 51.30 | 1.78 | w |
| 53.84 | 1.70 | w |
| 55.48 | 1.65 | w |

TABLE 3b

| 2-Θ | d (Å) | I/I₀ (%) |
|---|---|---|
| 7.66 | 11.53 | vs |
| 11.59 | 7.63 | w |
| 13.39 | 6.61 | m |
| 13.93 | 6.35 | w |
| 15.47 | 5.72 | w |
| 19.45 | 4.56 | w |
| 20.55 | 4.32 | w |
| 23.37 | 3.80 | w |
| 23.70 | 3.75 | m |
| 24.64 | 3.61 | m |
| 27.05 | 3.29 | w |
| 28.21 | 3.16 | w |
| 31.32 | 2.85 | m |
| 33.55 | 2.67 | w |
| 35.43 | 2.53 | w |
| 36.02 | 2.49 | w |
| 39.49 | 2.28 | w |
| 42.83 | 2.11 | w |
| 45.81 | 1.98 | w |
| 46.39 | 1.96 | w |
| 47.86 | 1.90 | w |
| 49.88 | 1.83 | w |
| 51.46 | 1.77 | w |
| 55.83 | 1.65 | w |

EXAMPLE 4

A Teflon bottle was charged with 150.00 g HM(OH)₂ (20 wt %) and a stir bar. TEOS (98%), 5.42 g, was added, the bottle sealed and the mixture allowed to stir overnight to hydrolyze TEOS. The reaction mixture was transferred to a Teflon beaker equipped with a high speed stirrer. Then 5.21 g pre-ground aluminum isopropoxide (AIP, 13.2 wt % Al) was added and dissolved with stirring. To the resulting clear solution, 17.43 g H₃PO₄ (86.0%) was added dropwise with continued stirring. Separately, 1.25 g KOAc was dissolved in 38.01 g deionized water and then added fast dropwise to the reaction mixture. The resulting clear solution was allowed to homogenize further before it was distributed among 6 Teflon-lined autoclaves which were digested at either 150° C. or 175° C. for a variety of time periods at autogenous pressures. The products were isolated by centrifugation, washed with deionized water and dried at room temperature. The product isolated from the 175° C. synthesis digested for 289 hours was identified as SAPO-69 via powder x-ray diffraction. Representative diffraction lines for this product are shown in Table 4. Elemental analysis revealed the material to have the empirical formula $HM_{0.22}K_{0.40}Al_{1.62}PSi_{1.63}$.

TABLE 4

| 2-Θ | d (Å) | I/I₀ (%) |
|---|---|---|
| 7.68 | 11.50 | s |
| 11.63 | 7.60 | w |
| 13.34 | 6.63 | m |
| 13.90 | 6.36 | w |
| 15.40 | 5.75 | m |
| 17.68 | 5.01 | w |
| 19.34 | 4.59 | m |
| 20.44 | 4.34 | m |
| 23.20 | 3.83 | s |
| 23.58 | 3.77 | vs |
| 24.16* | 3.68* | w |
| 24.66 | 3.61 | m |
| 26.86 | 3.32 | m |
| 28.12 | 3.17 | m |
| 30.40 | 2.94 | w |
| 31.24 | 2.86 | vs |
| 33.32 | 2.69 | m |
| 35.82 | 2.51 | m |
| 36.04 | 2.49 | m |
| 40.78 | 2.21 | w |
| 42.56 | 2.12 | w |
| 43.31 | 2.09 | w |
| 45.52 | 2.00 | w |
| 47.86 | 1.90 | w |
| 49.52 | 1.84 | w |
| 51.24 | 1.78 | w |
| 53.64 | 1.71 | w |
| 55.14 | 1.66 | w |
| 55.40 | 1.66 | m |

*Slight SOD Impurity

EXAMPLE 5

A Teflon bottle was charged with 884.59 g ETMAOH (20 wt %) and a stirbar. TEOS (98 wt %), 35.76 g, was added, the bottle sealed and mixed for 10 minutes on a stirplate. The bottle was transferred to a 100° C. oven for an hour. The resultant clear solution, was removed from the oven and mixed at room temperature for 15 minutes. Then aluminum isopropoxide (98+%), 35.06 g, was added and the mixture was stirred in a sealed bottle for approximately 2 hours, resulting in a clear solution. The mixture was then transferred to a Teflon beaker before 116.46 g of 85% H₃PO₄ was slowly added while mixing with an overhead stirrer. Separately, 10.11 g KBr was dissolved in 318.03 g deionized water. The KBr solution was then slowly added to the Si/Al/P/ETMAOH solution while continuing to mix with an overhead stirrer, resulting in a clear solution. The solution was transferred to a 2 L autoclave and digested for 7 d at 175° C. under static conditions at autogenous pressure. The obtained solid was collected and washed with deionized water by centrifugation and dried at 100° C. The product was identified as SAPO-69 by powder x-ray diffraction; representative diffraction lines for the product are shown in Table 5a. The elemental and CHN analyses showed the product to have the following composition: $ETMA_{0.62}K_{0.57}Al_{2.18}PSi_{2.71}$. A portion of the sample was calcined by placing the material in an oven in contact with a flowing N₂ atmosphere, ramping to 450° C. at a rate of 2° C./min and held there for 2 hours. The atmosphere was switched to flowing clean dry air and the sample was held at 450° C. for an additional 5 hours. The sample was found to be stable to calcination when it was analyzed by powder x-ray diffraction and identified as SAPO-69. Representative diffraction lines for the calcined SAPO-69 sample are shown in Table 5b.

TABLE 5

| 2-Θ | d (Å) | I/I₀ (%) |
|---|---|---|
| TABLE 5a | | |
| 7.74 | 11.41 | vs |
| 11.70 | 7.56 | w |
| 13.39 | 6.61 | m |
| 14.00 | 6.32 | w |
| 15.45 | 5.73 | w |
| 17.80 | 4.98 | w |
| 19.40 | 4.57 | m |
| 20.48 | 4.33 | m |
| 23.25 | 3.82 | m |
| 23.61 | 3.77 | m |
| 24.72 | 3.60 | m |
| 26.89 | 3.31 | w |
| 27.06 | 3.29 | w |
| 28.00 | 3.18 | m |
| 28.19 | 3.16 | m |
| 30.42 | 2.94 | w |
| 31.13 | 2.87 | vs |
| 31.29 | 2.86 | s |
| 33.34 | 2.68 | w |
| 35.45 | 2.53 | w |
| 35.80 | 2.51 | w |
| 36.04 | 2.49 | w |
| 39.16 | 2.30 | w |
| 40.76 | 2.21 | w |
| 42.53 | 2.12 | w |
| 42.80 | 2.11 | w |
| 43.30 | 2.09 | w |
| 45.54 | 1.99 | w |
| 46.10 | 1.97 | w |
| 47.89 | 1.90 | w |
| 48.57 | 1.87 | w |
| 49.52 | 1.84 | w |
| 51.26 | 1.78 | w |
| 53.62 | 1.71 | w |
| 53.80 | 1.70 | w |
| 55.10 | 1.67 | w |
| 55.34 | 1.66 | w |
| TABLE 5b | | |
| 7.70 | 11.48 | vs |
| 11.74 | 7.54 | w |
| 13.34 | 6.63 | m |
| 14.04 | 6.30 | w |
| 15.42 | 5.74 | w |
| 19.42 | 4.57 | w |
| 20.44 | 4.34 | w |
| 23.22 | 3.83 | w |
| 23.62 | 3.76 | m |
| 24.84 | 3.58 | m |
| 26.88 | 3.31 | w |
| 27.22 | 3.274 | w |
| 27.96 | 3.19 | w |
| 28.30 | 3.15 | w |
| 30.44 | 2.93 | w |
| 31.14 | 2.87 | m |
| 31.40 | 2.85 | m |
| 33.36 | 2.68 | w |
| 35.80 | 2.51 | w |
| 36.04 | 2.49 | w |
| 40.74 | 2.21 | w |
| 42.60 | 2.12 | w |
| 43.06 | 2.10 | w |
| 43.38 | 2.08 | w |
| 45.51 | 1.99 | w |
| 46.22 | 1.96 | w |
| 48.26 | 1.88 | w |
| 49.50 | 1.84 | w |
| 51.44 | 1.77 | w |
| 53.64 | 1.71 | w |
| 55.34 | 1.66 | w |

EXAMPLE 6

A portion of the as-synthesized SAPO-69 sample from Example 5 was ammonium ion-exchanged. SAPO-69, 10 g, was slurried in a solution containing 10 g $NH_4NO_3$ dissolved in 100 g deionized water. The slurry was heated to 75° C. while mixing in a covered beaker on a temperature controlled hotplate equipped with stirring. The slurry was maintained at 75° C. for 1 to 4 hours, collected by filtration, and washed with deionized water. This procedure was repeated for a total of three exchange steps. The sample was dried at 100° C. overnight after the final exchange. A portion of the sample was ramped to 450° C. in a flowing $N_2$ atmosphere at 2° C./minute, held at 450° C. in flowing $N_2$ for 2 hours before the atmosphere was switched to clean, dry air, in which the sample was held for another 5 hours at 450° C. The sample was identified as SAPO-69 by powder x-ray diffraction, exhibiting calcination stability. Representative diffraction lines for the calcined exchanged SAPO-69 sample are shown in Table 6.

TABLE 6

| 2-Θ | d (Å) | I/I₀ % |
|---|---|---|
| 7.76 | 11.39 | vs |
| 11.80 | 7.49 | w |
| 13.42 | 6.59 | m |
| 14.14 | 6.26 | w |
| 15.48 | 5.72 | w |
| 19.50 | 4.55 | w |
| 20.54 | 4.32 | w |
| 23.28 | 3.82 | w |
| 23.72 | 3.75 | m |
| 24.96 | 3.56 | m |
| 26.92 | 3.31 | w |
| 27.32 | 3.26 | w |
| 28.02 | 3.18 | w |
| 28.38 | 3.14 | w |
| 30.49 | 2.93 | w |
| 31.18 | 2.87 | m |
| 31.48 | 2.84 | m |
| 33.44 | 2.68 | w |
| 35.84 | 2.50 | w |
| 36.12 | 2.48 | w |
| 40.88 | 2.21 | w |
| 42.70 | 2.12 | w |
| 45.62 | 1.99 | w |
| 46.22 | 1.96 | w |
| 48.40 | 1.88 | w |
| 49.14 | 1.85 | w |
| 49.48 | 1.84 | w |
| 51.58 | 1.77 | w |
| 53.72 | 1.70 | w |
| 55.34 | 1.66 | W |

SPECIFIC EMBODIMENTS

While the following is described in conjunction with specific embodiments, it will be understood that this description is intended to illustrate and not limit the scope of the preceding description and the appended claims.

A first embodiment of the invention is a microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}{}_rM_m{}^+E_xPSi_yO_z$ where R is an organoammonium cation selected from the group consisting of ethyltrimethylammonium (ETMA⁺), hexamethonium (HM²⁺), choline [Me₃NCH₂CH₂OH]⁺, trimethylpropylammonium, tetramethylammonium (TMA⁺), diethyldimethylammonium (DEDMA⁺), tetraethylammonium (TEA⁺), tetrapropylammonium (TPA⁺) and mixtures thereof, "r" is the mole ratio of R to P and has a value of about 0.2 to about 3.0, "p" is the weighted average valence of R and varies from 1 to 2, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation $z=(m+p \cdot r+3 \cdot x+5+4 \cdot y)/2$ and is characterized in that it has the x-ray diffraction pattern having at least the d-spacings and intensities set forth in Table A

TABLE A

| 2Θ | d (Å) | I/I₀ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m |

An embodiment of the invention is one, any or all of prior embodiments in this paragraph up through the first embodiment in this paragraph where M is potassium. An embodiment of the invention is one, any or all of prior embodiments in this paragraph up through the first embodiment in this paragraph where E is aluminum. An embodiment of the invention is one, any or all of prior embodiments in this paragraph up through the first embodiment in this paragraph where E is gallium. An embodiment of the invention is one, any or all of prior embodiments in this paragraph up through the first embodiment in this paragraph where "y">"x". An embodiment of the invention is one, any or all of prior embodiments in this paragraph up through the first embodiment in this paragraph where the silicometallophosphate material is thermally stable up to a temperature of at least 500° C. An embodiment of the invention is one, any or all of prior embodiments in this paragraph up through the first embodiment in this paragraph where R is ethyltrimethylammonium cation, $ETMA^+$. An embodiment of the invention is one, any or all of prior embodiments in this paragraph up through the first embodiment in this paragraph where R is the hexamethonium cation, $HM^{2+}$. An embodiment of the invention is one, any or all of prior embodiments in this paragraph up through the first embodiment in this paragraph where a stable, calcined form of the crystalline microporous silicometallophosphate comprises a three-dimensional framework of $[EO_{4/2}]^-$ and $[PO_{4/2}]^+$ and $SiO_{4/2}$ tetrahedral units characterized in that it has the x-ray diffraction pattern having at least the d-spacings and intensities set forth in Table B

TABLE B

| 2Θ | d (Å) | I/I₀ % |
|---|---|---|
| 7.82-7.65 | 11.30-11.55 | s-vs |
| 11.89-11.67 | 7.44-7.58 | w-m |
| 13.47-13.30 | 6.57-6.65 | m |
| 14.20-13.96 | 6.23-6.34 | w |
| 19.62-19.32 | 4.52-4.59 | w |
| 20.69-20.35 | 4.29-4.36 | w-m |
| 23.52-23.08 | 3.78-3.85 | w-m |
| 23.84-23.52 | 3.73-3.78 | w-m |
| 25.06-24.64 | 3.55-3.61 | w-m |
| 27.08-26.75 | 3.29-3.33 | w |
| 28.49-28.22 | 3.13-3.16 | w-m |
| 31.36-31.03 | 2.85-2.88 | m |
| 31.59-31.25 | 2.83-2.86 | m |
| 33.67-33.28 | 2.66-2.69 | w |
| 36.04-35.74 | 2.49-2.51 | w |
| 36.34-35.89 | 2.47-2.50 | w |
| 41.09-40.61 | 2.195-2.22 | w |
| 43.04-42.40 | 2.10-2.13 | w |
| 46.04-45.31 | 1.97-2.00 | w |
| 46.53-46.04 | 1.95-1.97 | w |
| 48.65-48.10 | 1.87-1.89 | w |
| 51.91-51.13 | 1.76-1.785 | w |
| 56.03-55.12 | 1.64-1.665 | w |

A second embodiment of the invention is a process for preparing microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}{}_rM_m{}^+E_xPSi_yO_z$ where R is an organoammonium cation selected from the group consisting of ethyltrimethylammonium ($ETMA^+$), hexamethonium ($HM^{2+}$), choline $[Me_3NCH_2CH_2OH]^+$, trimethylpropylammonium, tetramethylammonium ($TMA^+$), diethyldimethylammonium ($DEDMA^+$), tetraethylammonium ($TEA^+$), tetrapropylammonium ($TPA^+$) and mixtures thereof, "r" is the mole ratio of R to P and has a value of about 0.2 to about 3.0, "p" is the weighted average valence of R and varies from 1 to 2, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation $z=(m+p \cdot r+3 \cdot x+5+4 \cdot y)/2$ and is characterized in that it has the x-ray diffraction pattern having at least the d-spacings and intensities set forth in Table A.

TABLE A

| 2Θ | d (Å) | I/I₀ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |

TABLE A-continued

| 2Θ | d (Å) | I/I₀ % |
|---|---|---|
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m | the process comprising forming a reaction mixture containing reactive sources of R, E, P, M and Si, and heating the reaction mixture at a temperature of about 60° C. to about 200° C. for a time sufficient to form the silicometallophosphate molecular sieve, the reaction mixture having a composition expressed in terms of mole ratios of the oxides of $aR_{2/p}O$ $bM_2O$ $E_2O_3$ $cP_2O_5$ $dSiO_2$ $eH_2O$ where "a" has a value of about 2.5 to about 20, "b" has a value of about 0.125 to about 1.5, "c" has a value of about 2 to about 8, "d" has a value of about 1 to about 8, and "e" has a value from 50 to 1000. An embodiment of the invention is one, any or all of prior embodiments in this paragraph up through the first embodiment in this paragraph where the initial reaction mixture is a clear solution before digestion. An embodiment of the invention is one, any or all of prior embodiments in this paragraph up through the first embodiment in this paragraph where M is selected from the group consisting of $Li^+$, $Na^+$, $K^+$, $Rb^+$ and $Cs^+$ and mixtures thereof. An embodiment of the invention is one, any or all of prior embodiments in this paragraph up through the first embodiment in this paragraph where the source of M is selected from the group consisting of halide salts, nitrate salts, acetate salts, sulfate salts, hydroxide salts and mixtures thereof. An embodiment of the invention is one, any or all of prior embodiments in this paragraph up through the first embodiment in this paragraph where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof. An embodiment of the invention is one, any or all of prior embodiments in this paragraph up through the first embodiment in this paragraph where the silicon source is selected from the group consisting of tetraethylorthosilicate, silicon alkoxides, fumed silica, colloidal silica, alkali silicate salts and precipitated silica. An embodiment of the invention is one, any or all of prior embodiments in this paragraph up through the first embodiment in this paragraph where the reaction mixture is reacted at a temperature of about 125° C. to about 185° C. for a time of about 2 day to about 14 days. An embodiment of the invention is one, any or all of prior embodiments in this paragraph up through the first embodiment in this paragraph where R is $ETMA^+$. An embodiment of the invention is one, any or all of prior embodiments in this paragraph up through the first embodiment in this paragraph where R is $HM^{2+}$. An embodiment of the invention is one, any or all of prior embodiments in this paragraph up through the first embodiment in this paragraph where R is a combination of $ETMA^+$ and at least one organoammonium cation selected from the group consisting of choline, $DEDMA^+$, $TMA^+$, $HM^{2+}$ trimethylpropylammonium, tetraethylammonium ($TEA^+$), and tetrapropylammonium ($TPA^+$). An embodiment of the invention is one, any or all of prior embodiments in this paragraph up through the first embodiment in this paragraph where R is a combination of $HM^{2+}$ and at least one organoammonium cation selected from the group consisting of choline, $DEDMA^+$, $TMA^+$, $ETMA^+$, trimethylpropylammonium, tetraethylammonium ($TEA^+$), and tetrapropylammonium ($TPA^+$). An embodiment of the invention is one, any or all of prior embodiments in this paragraph up through the first embodiment in this paragraph further comprising adding SAPO-69 seeds to the reaction mixture. A hydrocarbon conversion process comprising contacting a hydrocarbon stream with a catalyst at hydrocarbon conversion conditions to generate at least one converted product, wherein the catalyst is selected from the group consisting of a crystalline microporous SAPO-69 material, a crystalline microporous modified SAPO-69 material, a crystalline microporous calcined SAPO-69 material and mixtures thereof, where SAPO-69 is a crystalline microporous silicometallophosphate having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}_rM_m^+E_xPSi_yO_z$ where R is an organoammonium cation selected from the group consisting of ethyltrimethylammonium ($ETMA^+$), hexamethonium ($HM^{2+}$), choline $[Me_3NCH_2CH_2OH]^+$, trimethylpropylammonium, tetramethylammonium ($TMA^+$), diethyldimethylammonium ($DEDMA^+$), tetraethylammonium ($TEA^+$), tetrapropylammonium ($TPA^+$) and mixtures thereof, "r" is the mole ratio of R to P and has a value of about 0.2 to about 3.0, "p" is the weighted average valence of R and varies from 1 to 2, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation z=(m+p·r+3·x+5+4·y)/2 and is characterized in that it has the x-ray diffraction pattern having at least the d-spacings and intensities set forth in Table A

TABLE A

| 2Θ | d (Å) | I/I₀ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m | and the crystalline microporous modified SAPO-69 consists of a three-dimensional framework of $[EO_{4/2}]^-$ and $[PO_{4/2}]^+$ and $SiO_{4/2}$ tetrahedral units derived from SAPO-69 via the modification processes of calcination, ammonia calcinations, ion-exchange, steaming, various acid extractions, ammonium hexafluorosilicate treatment, or any combination thereof, while crystalline microporous calcined SAPO-69 consists of a three-dimensional framework of $[EO_{4/2}]^-$ and $[PO_{4/2}]^+$ and $SiO_{4/2}$ tetrahedral units derived from SAPO-69 via calcination and is characterized in that it has the x-ray diffraction pattern having at least the d-spacings and intensities set forth in Table B.

TABLE B

| 2Θ | d (Å) | I/I$_0$ % |
|---|---|---|
| 7.82-7.65 | 11.30-11.55 | s-vs |
| 11.89-11.67 | 7.44-7.58 | w-m |
| 13.47-13.30 | 6.57-6.65 | m |
| 14.20-13.96 | 6.23-6.34 | w |
| 19.62-19.32 | 4.52-4.59 | w |
| 20.69-20.35 | 4.29-4.36 | w-m |
| 23.52-23.08 | 3.78-3.85 | w-m |
| 23.84-23.52 | 3.73-3.78 | w-m |
| 25.06-24.64 | 3.55-3.61 | w-m |
| 27.08-26.75 | 3.29-3.33 | w |
| 28.49-28.22 | 3.13-3.16 | w-m |
| 31.36-31.03 | 2.85-2.88 | m |
| 31.59-31.25 | 2.83-2.86 | m |
| 33.67-33.28 | 2.66-2.69 | w |
| 36.04-35.74 | 2.49-2.51 | w |
| 36.34-35.89 | 2.47-2.50 | w |
| 41.09-40.61 | 2.195-2.22 | w |
| 43.04-42.40 | 2.10-2.13 | w |
| 46.04-45.31 | 1.97-2.00 | w |
| 46.53-46.04 | 1.95-1.97 | w |
| 48.65-48.10 | 1.87-1.89 | w |
| 51.91-51.13 | 1.76-1.785 | w |
| 56.03-55.12 | 1.64-1.665 | w |

An embodiment of the invention is one, any or all of prior embodiments in this paragraph up through the first embodiment in this paragraph wherein the hydrocarbon conversion process is selected from the group consisting of cracking, hydrocracking, alkylation, isomerization, polymerization, reforming, hydrogenation, dehydrogenation, transalkylation, dealkylation, hydration, dehydration, hydrotreating, hydrofining, hydrodenitrogenation, hydrodesulfurization, methanol to olefins, methanation, syngas shift process, olefin dimerization, oligomerization, dewaxing, and combinations thereof. An embodiment of the invention is one, any or all of prior embodiments in this paragraph up through the first embodiment in this paragraph wherein the hydrocarbon conversion process is hydrocracking or hydrotreating and wherein the hydrocracking or hydrotreating is operated at a temperature in the range of about 400° to about 1200° F. (204-649° C.) and a pressure in the range of atmospheric to about 3,500 psig (24,132 kPa g). An embodiment of the invention is one, any or all of prior embodiments in this paragraph up through the first embodiment in this paragraph wherein the hydrocarbon conversion process is catalytic cracking operated at a temperature in the range of about 850° to about 1100° F., LHSV values of 0.5 to 10 and a pressure in the range of from about 0 to about 50 psig. An embodiment of the invention is one, any or all of prior embodiments in this paragraph up through the first embodiment in this paragraph wherein the hydrocarbon conversion process is alkylation of aromatics and the converted product is at least one linear alkyl substituted aromatic, and wherein the process is operated at an aromatic olefin mole ratio of between 51 and 301, a LHSV of about 0.3 to about 6 hr-1, a temperature of about 100° to about 250° C. and a pressures of about 200 to about 1000 psig. An embodiment of the invention is one, any or all of prior embodiments in this paragraph up through the first embodiment in this paragraph wherein the hydrocarbon conversion process is the conversion of methanol to olefins wherein the process is operated at a temperature of about 300° C. to about 600° C. and a pressure from about 0 kPa (0 psig) to about 1724 kPa (250 psig). A separation process comprising contacting at least two components with a material to generate at least one separated component, wherein the catalyst is selected from the group consisting of a crystalline microporous SAPO-69 material, a crystalline microporous modified SAPO-69 material, a crystalline microporous calcined SAPO-69 material and mixtures thereof, where SAPO-69 is a crystalline microporous silicometallophosphate having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}_rM_m^+E_xPSi_yO_z$ where R is an organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.2 to about 3.0, "p" is the weighted average valence of R and varies from 1 to 2, M is an alkali metal such as Li$^+$, Na$^+$, K$^+$, Rb$^+$ and Cs$^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation $z=(m+p\cdot r+3\cdot x+5+4\cdot y)/2$ and is characterized in that it has the x-ray diffraction pattern having at least the d-spacings and intensities set forth in Table A.

TABLE A

| 2Θ | d (Å) | I/I$_0$ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m | the crystalline microporous modified SAPO-69 consists of a three-dimensional framework of $[EO_{4/2}]^-$ and $[PO_{4/2}]^+$ and $SiO_{4/2}$ tetrahedral units derived from SAPO-69 via the modification processes of calcination, ammonia calcinations, ion-exchange, steaming, various acid extractions, ammonium hexafluorosilicate treatment, or any combination thereof, while crystalline microporous calcined SAPO-69 consists of a three-dimensional framework of $[EO_{4/2}]^-$ and $[PO_{4/2}]^+$ and $SiO_{4/2}$ tetrahedral units derived from SAPO-69 via calcination and is characterized in that it has the x-ray diffraction pattern having at least the d-spacings and intensities set forth in Table B set forth above.

The invention claimed is:

1. A microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of:

$$R^{p+}_r M^+_m E_x PSi_y O_z$$

where R is an organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.2 to about 3.0, "p" is the weighted average valence of R and varies from 1 to 2, M is an alkali metal such as Li$^+$, Na$^+$, K$^+$, Rb$^+$ and Cs$^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.30 to about 4.5, "y">"x"−1, and "z" is the mole ratio of O to P and has a value determined by the equation:

$$z=(m+p \cdot r+3 \cdot x+5+4 \cdot y)/2$$

and is characterized in that it has the x-ray diffraction pattern having at least the d-spacings and intensities set forth in Table A:

TABLE A

| 2Θ | d (Å) | I/I$_0$ % |
|---|---|---|
| 7.78-7.63 | 11.35-11.58 | m-vs |
| 11.76-11.54 | 7.52-7.66 | w-m |
| 13.45-13.28 | 6.58-6.66 | w-m |
| 14.07-13.85 | 6.29-6.39 | w-m |
| 15.53-15.34 | 5.70-5.77 | w-m |
| 19.54-19.28 | 4.54-4.60 | w-m |
| 20.64-20.35 | 4.30-4.36 | w-s |
| 23.52-23.08 | 3.78-3.85 | w-s |
| 23.77-23.52 | 3.74-3.78 | w-vs |
| 24.82-24.57 | 3.59-3.62 | w-vs |
| 27.04-26.77 | 3.30-3.33 | w-m |
| 28.31-28.04 | 3.15-3.18 | w-m |
| 31.42-31.03 | 2.85-2.88 | w-vs |
| 33.67-33.23 | 2.66-2.69 | w-m |
| 36.04-35.74 | 2.49-2.51 | w-m |
| 36.19-35.89 | 2.48-2.50 | w-m |
| 40.99-40.61 | 2.20-2.22 | w |

TABLE A-continued

| 2Θ | d (Å) | I/I$_0$ % |
|---|---|---|
| 43.04-42.40 | 2.10-2.13 | w-m |
| 48.08-47.70 | 1.89-1.91 | w-m |
| 51.60-51.13 | 1.77-1.79 | w-m |
| 56.07-55.15 | 1.64-1.66 | w-m. |

2. The silicometallophosphate material of claim 1 where M is potassium.

3. The silicometallophosphate material of claim 1 in where "y">"x".

4. The silicometallophosphate material of claim 1 where the silicometallophosphate material is thermally stable up to a temperature of at least 500° C.

5. The silicometallophosphate material of claim 1 where R is ethyltrimethylammonium cation, ETMA$^+$.

6. The silicometallophosphate material of claim 1 where R is the hexamethonium cation, HM$^{2+}$.

7. A stable, calcined form of the crystalline microporous silicometallophosphate of claim 1, comprising a three-dimensional framework of $[EO_{4/2}]^-$ and $[PO_{4/2}]^+$ and $SiO_{4/2}$ tetrahedral units characterized in that it has the x-ray diffraction pattern having at least the d-spacings and intensities set forth in Table B:

TABLE B

| 2Θ | d (Å) | I/I$_0$ % |
|---|---|---|
| 7.82-7.65 | 11.30-11.55 | s-vs |
| 11.89-11.67 | 7.44-7.58 | w-m |
| 13.47-13.30 | 6.57-6.65 | m |
| 14.20-13.96 | 6.23-6.34 | w |
| 19.62-19.32 | 4.52-4.59 | w |
| 20.69-20.35 | 4.29-4.36 | w-m |
| 23.52-23.08 | 3.78-3.85 | w-m |
| 23.84-23.52 | 3.73-3.78 | w-m |
| 25.06-24.64 | 3.55-3.61 | w-m |
| 27.08-26.75 | 3.29-3.33 | w |
| 28.49-28.22 | 3.13-3.16 | w-m |
| 31.36-31.03 | 2.85-2.88 | m |
| 31.59-31.25 | 2.83-2.86 | m |
| 33.67-33.28 | 2.66-2.69 | w |
| 36.04-35.74 | 2.49-2.51 | w |
| 36.34-35.89 | 2.47-2.50 | w |
| 41.09-40.61 | 2.195-2.22 | w |
| 43.04-42.40 | 2.10-2.13 | w |
| 46.04-45.31 | 1.97-2.00 | w |
| 46.53-46.04 | 1.95-1.97 | w |
| 48.65-48.10 | 1.87-1.89 | w |
| 51.91-51.13 | 1.76-1.785 | w |
| 56.03-55.12 | 1.64-1.665 | w. |

* * * * *